Sept. 6, 1932.  H. KNIPPLE  1,876,460
PORTABLE CRUSHING, SCREENING, AND LOADING PLANT
Filed June 25, 1930   6 Sheets-Sheet 6
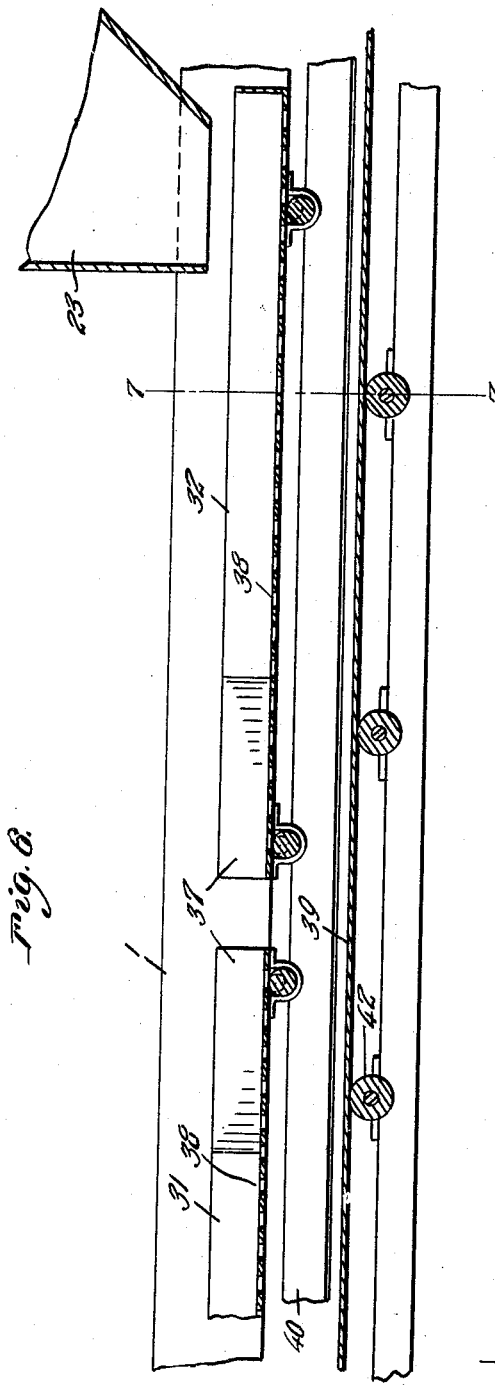
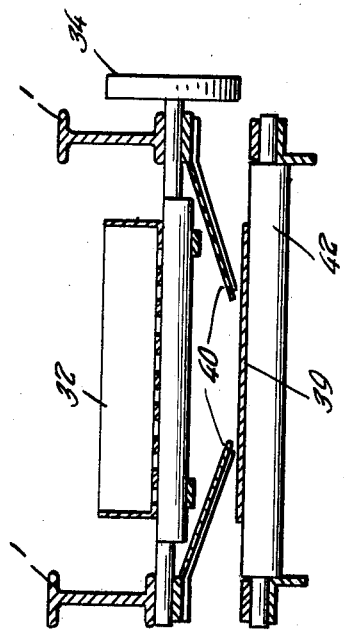
Inventor
Hank Knipple
By Clarence A O'Brien
Attorney Patented Sept. 6, 1932

1,876,460

UNITED STATES PATENT OFFICE

HANK KNIPPLE, OF BOZEMAN, MONTANA

PORTABLE CRUSHING, SCREENING, AND LOADING PLANT

Application filed June 25, 1930. Serial No. 463,722.

This invention is a portable crushing, screening and loading plant for reducing rock material to desired sizes for road and construction work.

Usually crushing plants are large and cumbersome structures which can be moved from place to place and set up only at very large expense and with considerable time consuming labor. Their construction and arrangement of parts are also such as to subject machinery to considerable wear and tear during the crushing operation and the resultant product is not always satisfactory.

The present invention provides a crushing plant which lacks the disadvantages of present types of crushing plants and which presents novel features of improvement in the particular construction and arrangement of the various mechanisms, including among other features a portable chassis which is easily movable from place to place at little expense; a main crusher and a reduction crusher at opposite ends of the chassis; screens arranged at the bottom instead of at the top of the structure as in existing types of plants thus rendering the machine more efficient and adaptable to the work for which it is intended; a delivering or loading conveyor frame and belt extending the full length of the chassis under the screens and above the chassis axles to receive the finished products; and a conveyor at right angles to the chassis for carrying the rejected material from the screen back to the reduction crusher.

A further object of the invention is to provide a portable crusher, screening and loading plant adapted to be economically constructed and operated, and having the various mechanisms easily accessible for purposes of repairs, replacement, or adjustment, etc.

In the accompanying drawings illustrating the invention:

Figure 6 is a detail view on an enlarged scale of a longitudinal section of a part of the apparatus, Figure 7 is a cross section on line 7—7 of Figure 6, and Figure 8 is a detail showing a cross section of the delivery conveyor belt and one of the supporting drums, and Figure 9 is a detail view of one of the eccentric shafts.

Figure 1:
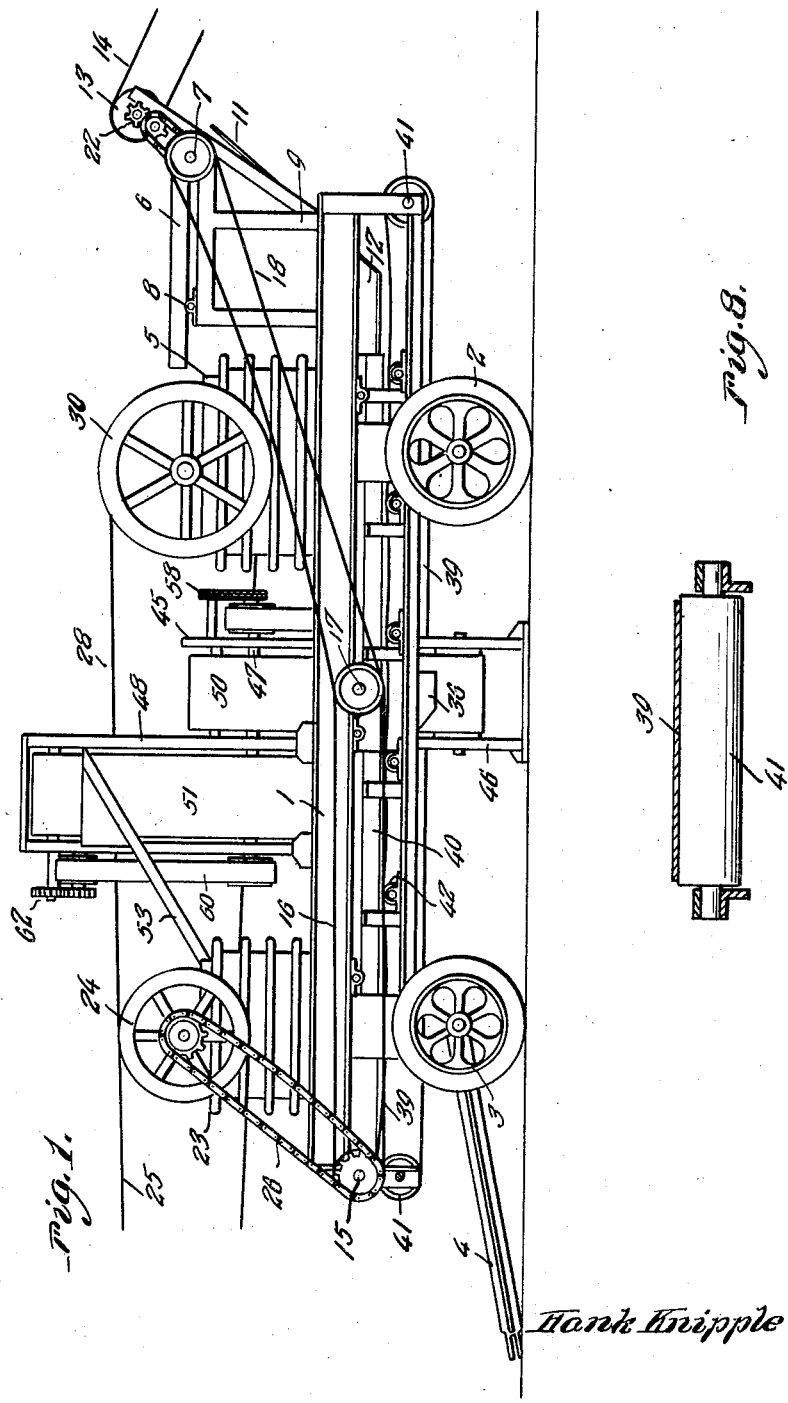
Figure 1 is a right side elevation of the machine.

In order that the apparatus may be portable so as to thus eliminate the very large cost heretofore involved in moving and setting up machines of this character, the various mechanisms are mounted on a wheeled base which can be coupled with a towing vehicle when moving from one field of operation to another.

In the accompanying drawings, the wheel base is shown as comprising a truck chassis including main side bars 1 of I beam cross section, rear axle assembly 2 and a front axle assembly consisting of a guiding truck 3 having a towing pole or tongue 4. The wheels of each assembly are equipped with pneumatic tires, as illustrated. Mounted upon the chassis adjacent the rear receiving end thereof is a main crusher 5 into which is discharged rock material from a vibratory receiving screen 6 supported at an elevation upon revolving eccentric shafts 7 and 8 journalled in bearings on a frame 9 at the rear end of the chassis.

Sand entering the screen along with the rock is separated from the latter and ejected during the vibration of the screen, through holes 10 in bottom of the screen and falls down upon an inclined plate 11 having a collecting portion 12 in which the sand settles and from which it may be subsequently removed.

Journalled in bearings between the outer ends of rearwardly inclined members of frame 9 is a head drum 13 for a pit conveyor 14 from which the machine receives the material. The pit conveyor and the receiving screen are both operated from a cross shaft 15 at the front end of the chassis and which is connected by a belt and pulley drive 16 with one of the revoluble eccentric screen drive shafts, indicated at 17, which shaft is likewise connected by the belt and pulley drive 18 with the rear eccentric shaft 7 of the receiving screen 6.

A balance or timing wheel 19 is mounted on each shaft 7 and 8 and an adjusting rod 20 connects the wheels to keep both eccentric shafts revolving in time with each other, the rear shaft 7 drives the drum shaft 21 of the pit conveyor drum 13 through suitable gearing indicated at 22.

Mounted upon the chassis adjacent the forward end thereof is a reduction crusher 23 having a driving pulley 24 mounted on one end of its operating shaft and connected by a power belt 25 with any suitable source of power. The cross shaft 15 is driven from the reduction crusher shaft by a sprocket and chain drive 26. A driving pulley 27 on the other end of the reduction crusher shaft is connected by a belt 28 with a driven pulley 29 on the corresponding end of the main crusher shaft which has a counterbalancing fly wheel 30 on its opposite end.

Figure 2:
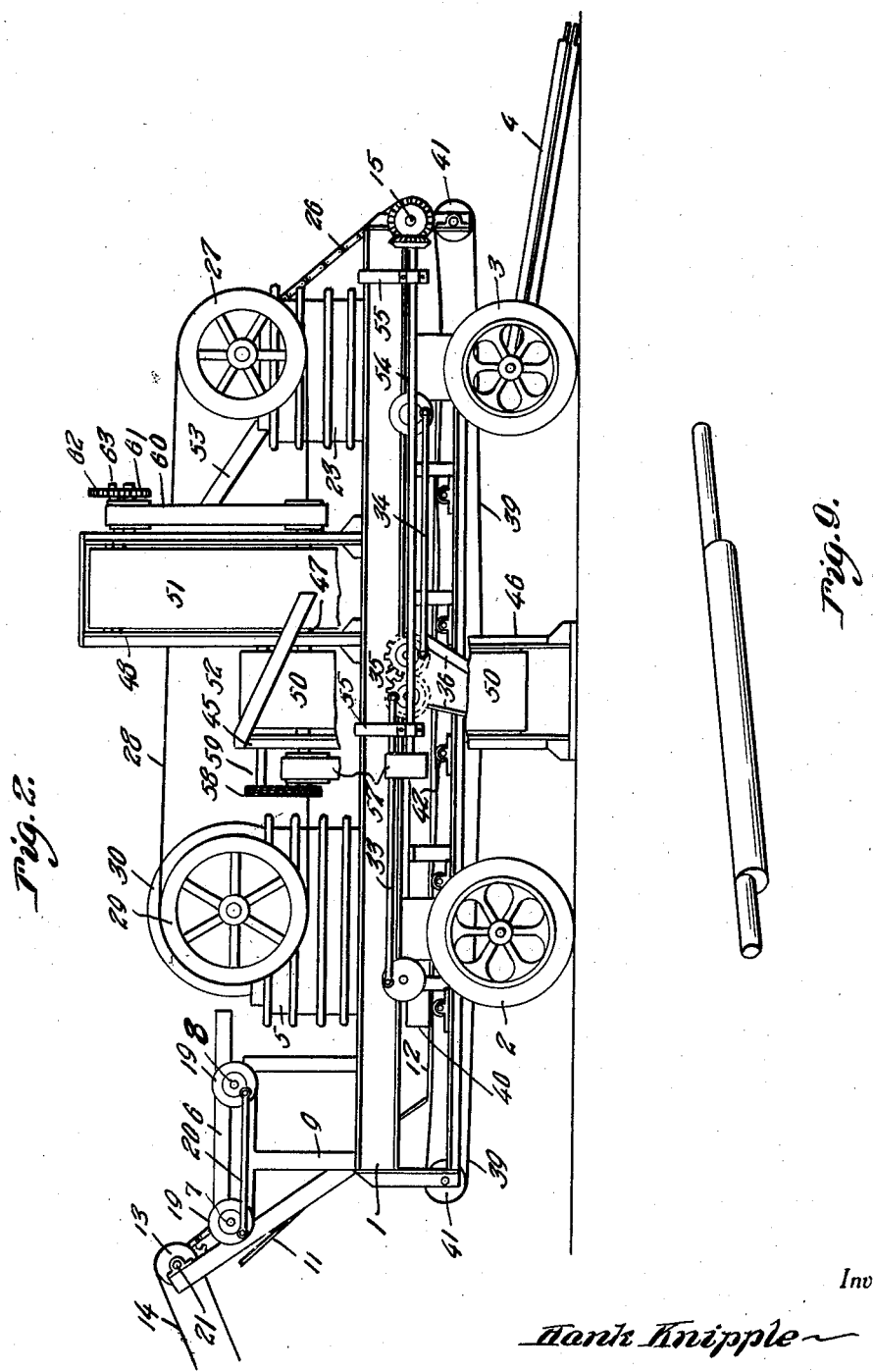
Figure 2 is a left side elevation.
Figure 3:
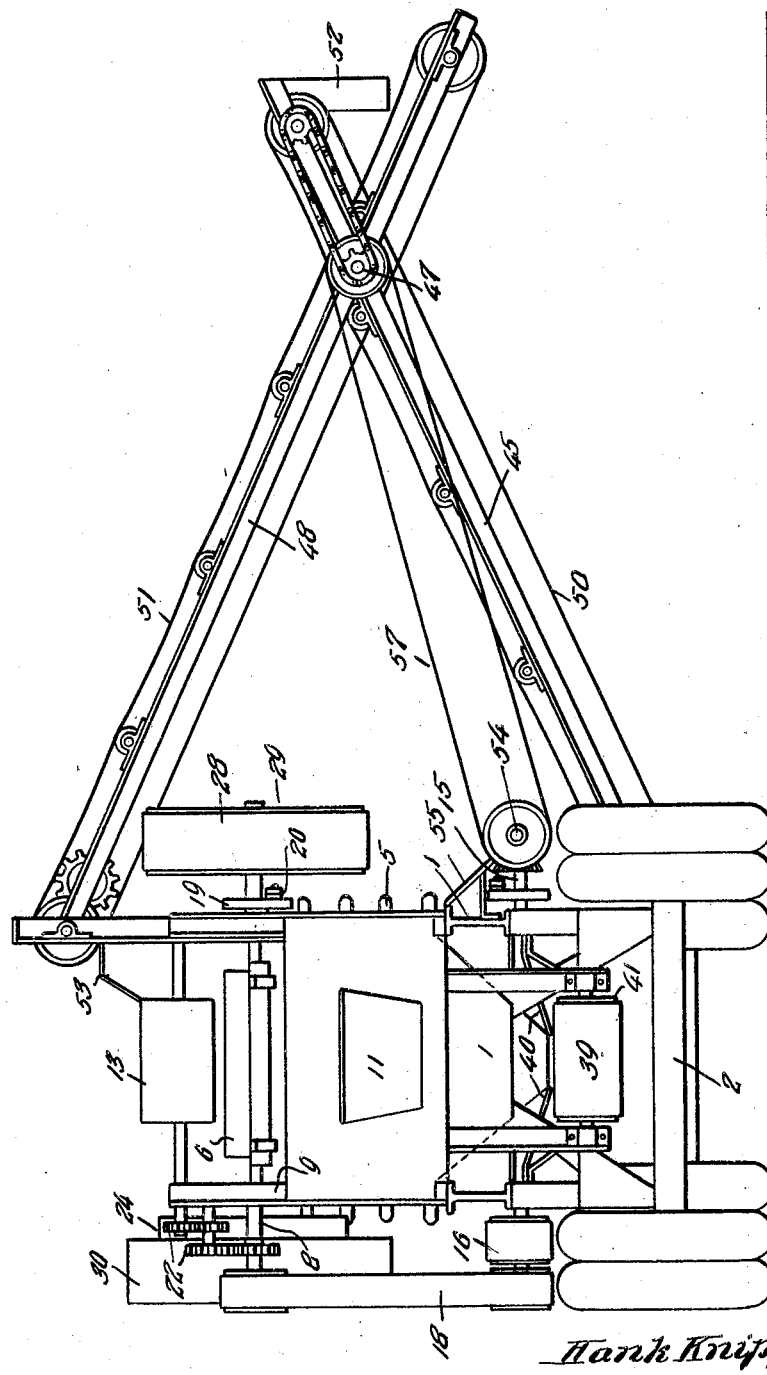
Figure 3 is a rear end view.
Figure 5:
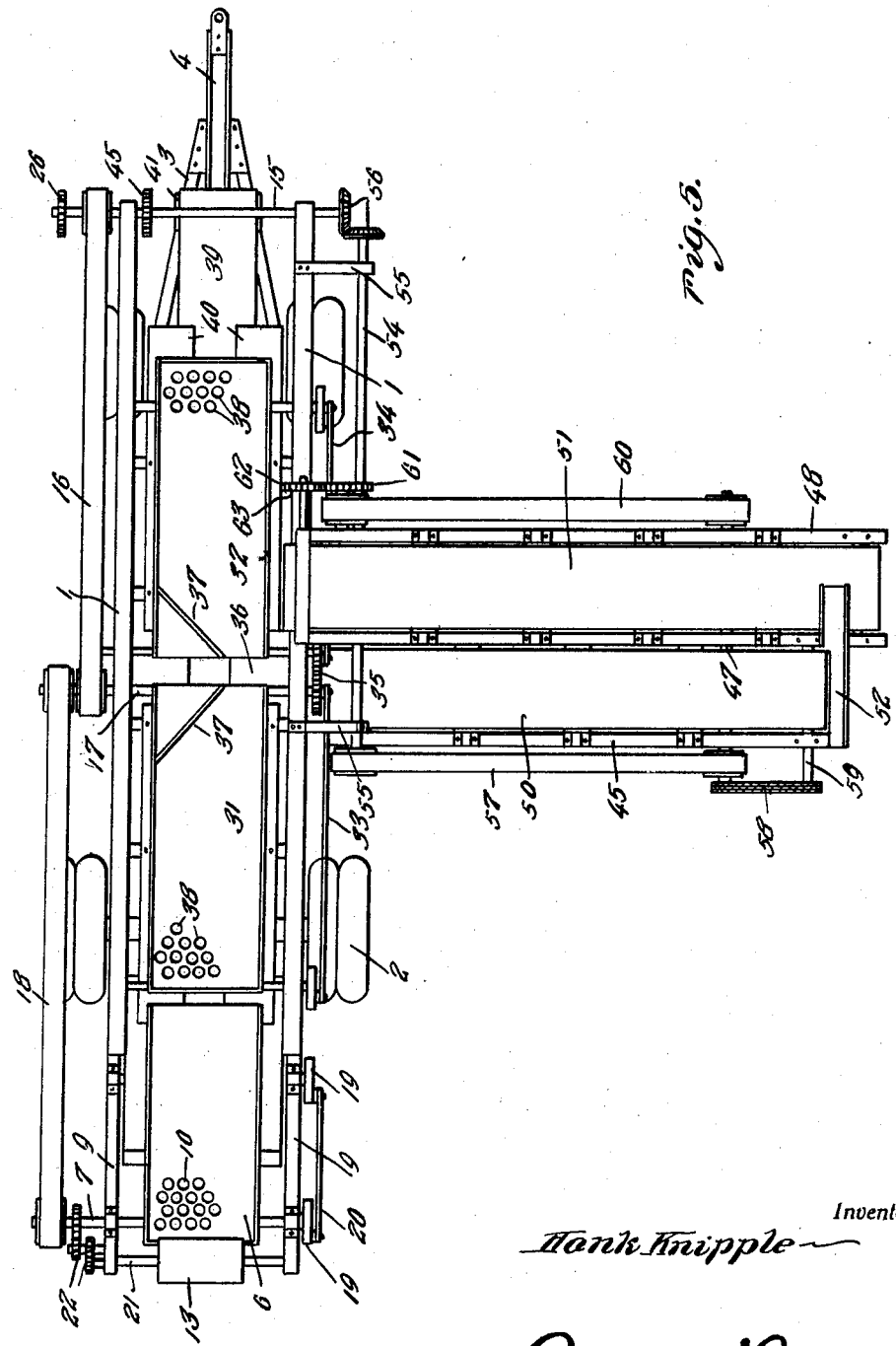
Figure 5 is a top plan.

Under each crusher is arranged a screen as shown at 31 and 32. Each screen is supported by a pair of revoluble eccentric shafts and the shafts of each screen are connected together, as shown at 33 and 34, in the same manner as the previously described shafts 7 and 8 of the receiving screen, for corresponding movement. The crusher screens 31 and 32 receive the discharge from the crusher 5 and 23 respectively and by reason of a reverse gearing connection 35, shown in Figures 2 and 5, are operated to work the unscreened or rejected material inwardly toward their adjacent ends which are open to discharge material into the rejection chute 36 located beneath the open end of the said screens.

Obliquely disposed reflecting plates 37 are secured in adjacent corners on one side of the screens for directing the rejection material to the rejection chute 36. The screens are operated by the belt drive 16 connecting the screen drive shaft 17 with the cross shaft 15 and the screened material passing through the screen holes 38 drops upon the upper stress or run of the delivery conveyor belt 39. Deflecting boards 40 are secured at opposite sides of the chassis and extend longitudinally of the breaker screens to direct the finished material to the delivery conveyor belt.

The delivery conveyor belt is suitably mounted in the frame under the screens and above the chassis axles to receive the finished product and carry it to the front end of the chassis where it is delivered to another conveyor (not shown) which conveys it to a storage place. The delivery belt extends the full length of the chassis and is supported at its opposite ends upon drums 41. A plurality of cross rollers 42 are suitably arranged to support the upper runs of the delivery belt at spaced points throughout its length.

Figure 4:
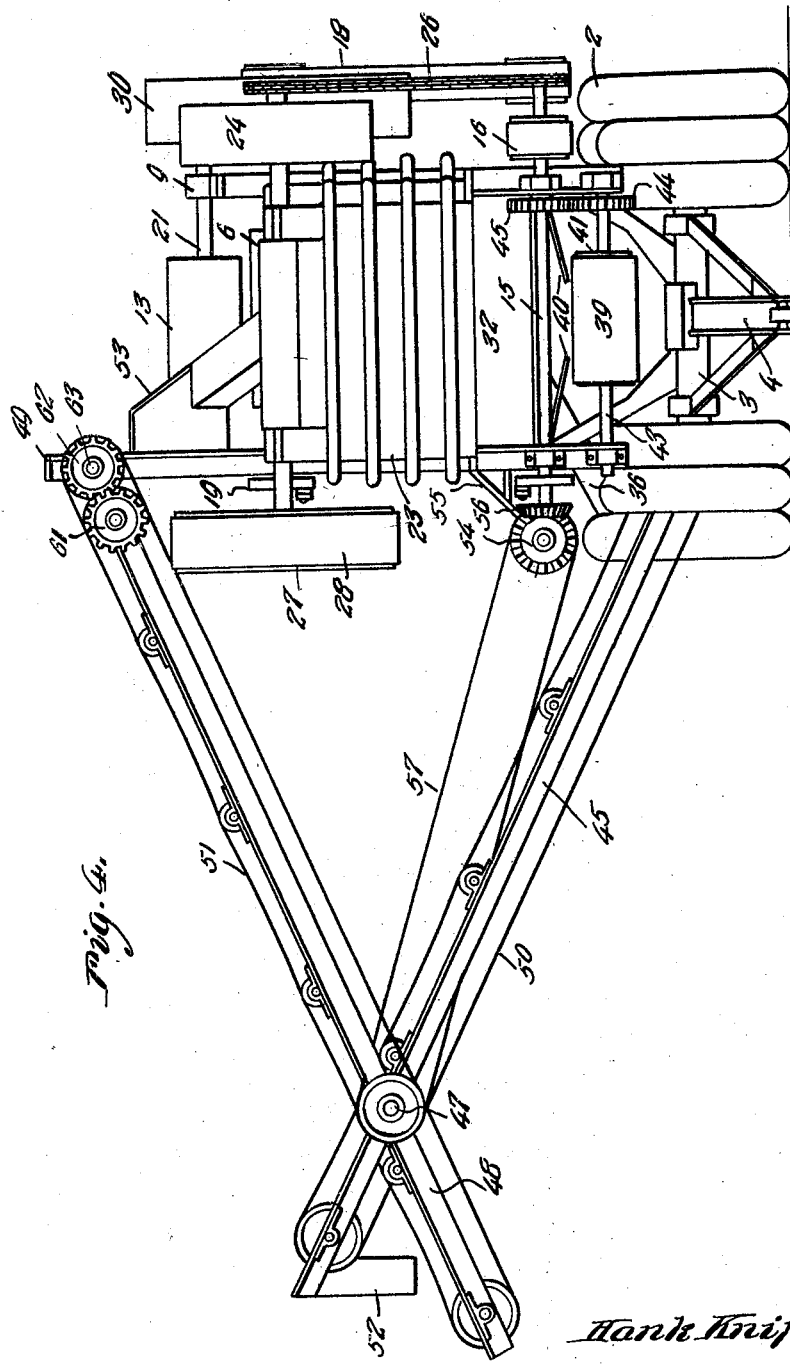
Figure 4 is a front end view.

As shown in Figure 4, the delivery belt is actuated from the forward drum shaft 43 upon which is fixed a gear 44 in mesh with a gear 45 fixed on the cross shaft 15. In the operation of the machine, the rock material is fed into the vibrating receiving screen 6 where the sand is separated from the rock and the latter discharged into the crusher 5 where it is crushed and broken up into smaller pieces and ejected on to the vibrating screen 31.

The material is sifted by screen 31 so that the desired particles escape through the screen holes to the delivery belt while the larger or rejected particles are discharged into the chute 36 which empty on to a reduction conveyor which carries such rejected material to the reduction crusher for a further and finer crushing.

The reduction conveyor consists of a conveyor frame 45 extending outwardly from one side of the chassis adjacent the center thereof and at right angles to the chassis with its inner end suitably supported in a frame 46 depending from the under side of the chassis. The frame 45 is inclined upwardly and is provided adjacent its outer elevated end with bearings rotatably supporting a cross shaft 47 on the outer end of which is supported a conveyor frame 48 which is inclined oppositely with respect to the lower frame 45 and has its upper end disposed adjacent the reduction crusher 23 and suitably supported between the uprights of a vertical supporting frame 49 mounted on an I beam 1 of the chassis.

Each frame has a conveyor assembly indicated generally at 50 and 51 respectively including belt end drums and roller bearings for the upper runs of the belts, as illustrated. The conveyor 50 receives the rejected material from the chute 36 and discharges it upon the conveyor 51 through a laterally disposed spout 52 at its upper end. The conveyor 51 discharges the rejected material into the crusher 23 through a spout 53.

Motion is transmitted to the reduction conveyor belt from a line shaft 54 supported in brackets 55 on the reduction side of the chassis. The line shaft is driven from the cross shaft 15 by gearing 56 at their adjacent ends and a belt and pulley drive 57 connects the other end of the line shaft with the reduction conveyor drive shaft 47.

A chain drive 58 connects shaft 47 with the outer drum shaft 59 of conveyor 50. A belt and pulley drive 60 on the outer side of frame 48 connects the shaft 47 with the shaft of a reversing gear 61 which meshes with a drive gear 62 fixed on the upper drum shaft 63 of the conveyor 51, which is thus operated in the proper direction for conveying the rejection material to the rejection crusher.

From the rejection crusher, the material is discharged upon the screen 32 through which it passes to the delivery belt while the larger particles or residue are discharged through spout 36 into the rejection conveyor and reconveyed back to the reduction crusher along with the rejected material from screen 31.

The shaker screens 6, 36 and 31 are all operated by revolving eccentric shafts, such as shown in Figure 9, which are more desirable than any other type for the reason that they automatically shift the screening forward without unusual wear or tear on the machinery, the life and efficiency of which is thereby prolonged. The main or breaker and reduction crusher are of conventional design and well known construction, and hence have not been described in detail as their specific construction of the present invention.

From the foregoing, it will be apparent that once material has been loaded into the main crusher, it will keep revolving through the machinery until it is finally in the proper form to go out on the delivery belt as a finished product, for the reason that the unfinished product is conveyed from the screen to the reduction crusher and this process is repeated many times in order to completely reduce the material to the proper size.

Having thus described my invention, what I claim as new is:

1. A crushing and screening apparatus comprising a supporting frame, a main crusher and reduction crusher mounted on said frame one adjacent each end thereof, a vibratory screen located under each crusher, a single longitudinally extending conveyor extending under both screens for receiving the material passing through the screens and delivering said material at one end of the apparatus, means for actuating the screens in a manner to cause the material failing to pass through the perforations therein to drop from the adjacent or inner ends of the screens, a chute for receiving this material dropping from the inner ends of the screens, and conveyor means for conveying the material from said chute to the reduction crusher.

2. A crushing and screening apparatus comprising a supporting frame, a main crusher and reduction crusher mounted on said frame one adjacent each end thereof, a vibratory screen located under each crusher, a single longitudinally extending conveyor extending under both screens for receiving the material passing through the screens and delivering said material at one end of the apparatus, means for actuating the screens in a manner to cause the material failing to pass through the perforations therein to drop from the adjacent or inner ends of the screens, a chute for receiving this material dropping from the inner ends of the screens, conveyor means for conveying the material from said chute to the reduction crusher, means for operating the reduction crusher, means for operating the main crusher from the reduction crusher, a driven shaft, means for operating the same from the reduction crusher, a vibratory screen supported on that end of the frame adjacent the main crusher for screening the material before it is delivered into the main crusher, a receiver supported on the frame for receiving material passing through the last-mentioned screen, and means for operating the three screens and the two sets of conveyor means from said driven shaft.

In testimony whereof I affix my signature.

HANK KNIPPLE.